(12) United States Patent
Shin et al.

(10) Patent No.: US 9,511,967 B2
(45) Date of Patent: Dec. 6, 2016

(54) APPARATUS FOR MANUFACTURING CURRENT COLLECTOR

(71) Applicant: KOREAJCC CO., LTD., Cheongwon-gun (KR)

(72) Inventors: Dal Woo Shin, Cheongju-si (KR); Mun Soo Lee, Cheongju-si (KR); Jin Sik Shin, Cheongju-si (KR)

(73) Assignee: KOREAJCC CO., LTD. (KR)

( * ) Notice: Subject to any disclaimer, the term of this patent is extended or adjusted under 35 U.S.C. 154(b) by 310 days.

(21) Appl. No.: 14/332,669

(22) Filed: Jul. 16, 2014

(65) Prior Publication Data
US 2015/0344252 A1 Dec. 3, 2015

(30) Foreign Application Priority Data
May 29, 2014 (KR) ........................ 10-2014-0064782

(51) Int. Cl.
*B65H 18/14* (2006.01)
*B21D 28/36* (2006.01)
*B21D 31/04* (2006.01)

(52) U.S. Cl.
CPC ............ *B65H 18/145* (2013.01); *B21D 28/36* (2013.01); *B21D 31/046* (2013.01); *B65H 2301/5126* (2013.01); *B65H 2404/1415* (2013.01); *B65H 2801/72* (2013.01)

(58) Field of Classification Search
CPC ..................... B21B 15/007; B21B 2015/0057; B21B 2015/0064; B21B 15/0007; B21D 13/04; B21D 28/36; B21D 31/046; B21H 8/00; B26F 1/06–1/10; B21C 47/02; B21C 47/04; B21C 47/18; B65H 18/145

USPC ........................................... 72/85, 186, 206
See application file for complete search history.

(56) References Cited

U.S. PATENT DOCUMENTS

| | | | | |
|---|---|---|---|---|
| 5,142,755 A | * | 9/1992 | Alhamad ............. | B21D 31/046 29/6.1 |
| 6,776,366 B2 | * | 8/2004 | Tschesche ............... | B21B 35/10 100/168 |
| 7,965,492 B2 | | 6/2011 | Oh | |
| 9,308,573 B2 | * | 4/2016 | Wiedner .................. | B21H 8/00 |
| 9,434,083 B2 | * | 9/2016 | Douillard .................. | B26F 1/20 |
| 2005/0044915 A1 | * | 3/2005 | Shimizu .................. | B21D 28/36 72/186 |

FOREIGN PATENT DOCUMENTS

KR   1020130078646   7/2013

* cited by examiner

*Primary Examiner* — Moshe Wilensky
*Assistant Examiner* — Pradeep C Battula
(74) *Attorney, Agent, or Firm* — Cantor Colburn LLP

(57) ABSTRACT

An apparatus for manufacturing a current collector includes a supply reel configured to have metal foil wound on the supply reel, a pair of transfer rollers disposed on one side of the supply reel, a hole formation unit disposed on one side of the transfer rollers and configured to include an upper roller including first protrusion cutter modules and first groove cutter modules configured to form through holes in the metal foil transferred by the transfer roller and a lower roller including second protrusion cutter modules and second groove cutter modules configured to form the through holes in the metal foil, and a pair of thickness control rollers disposed on one side of the hole formation unit, spaced apart from each other, and configured to control so that a thickness of the current collector is smaller than the specific interval.

6 Claims, 4 Drawing Sheets

# APPARATUS FOR MANUFACTURING CURRENT COLLECTOR

CROSS-REFERENCE TO RELATED APPLICATION

This application claims the benefit of Korean Patent Application No. 10-2014-0064782, filed on May 29, 2014, in the Korean Intellectual Property Office, the disclosure of which is incorporated herein by reference.

BACKGROUND OF THE INVENTION

1. Field of the Invention

The present invention relates to an apparatus for manufacturing a current collector and, more particularly, to an apparatus for manufacturing a current collector, which is capable of forming a current collector so that a plurality of through holes is arranged in metal foil while consecutively transferring the metal foil using protrusion cutters and groove cutters.

2. Description of the Related Art

A lithium cell, a lithium capacitor, or an electric double layer capacitor requires higher voltage in order to improve energy density. Energy density uses pre-doping, and such pre-doping is implemented by forming through holes in a current collector. The through holes formed in the current collector enable lithium ions to reversibly move, thereby being capable of increasing energy density by doping the lithium ions on anode materials.

Korean Patent Application Publication No. 2013-0078646 relates to an electrode for improving energy density as described above. The electrode disclosed in the Korean Patent Application Publication No. 2013-0078646 includes a porous current collector having a three-dimensional structure. The porous current collector of the three-dimensional structure is filled with sulfur at a predetermined ratio, and it includes a plurality of cavities. Any one of foaming metal, such as nickel foam, carbon mat, and carbon felt is used as the porous current collector having such a three-dimensional structure. The carbon felt is made of carbon fiber including a plurality of pores and sulfur intervened in the pores.

A conventional current collector improves energy density by forming pores as in the Korean Patent Application Publication No. 2013-0078646, but is problematic in that productivity is low and a production cost is increased because nickel foam is used as a method for forming the pores in the current collector.

SUMMARY OF THE INVENTION

Accordingly, the present invention has been made keeping in mind the above problems occurring in the prior art, and an object of the present invention is to provide an apparatus for manufacturing a current collector, which is capable of forming a current collector so that a plurality of through holes is arranged in metal foil while consecutively transferring the metal foil using protrusion cutters and groove cutters.

Another object of the present invention is to provide an apparatus for manufacturing a current collector, which is capable of improving the productivity of current collectors by forming the current collector so that a plurality of through holes is arranged in metal foil while consecutively transferring the metal foil using protrusion cutters and groove cutters.

Yet another object of the present invention is to provide an apparatus for manufacturing a current collector, which is capable of reducing the production cost of a current collector by forming the current collector so that a plurality of through holes is arranged in metal foil while consecutively transferring the metal foil using protrusion cutters and groove cutters.

In accordance with an aspect of the present invention, an apparatus for manufacturing a current collector includes a supply reel configured to have metal foil wound on the supply reel; a pair of transfer rollers disposed on one side of the supply reel and configured to transfer the metal foil wound on the supply reel; a hole formation unit disposed on one side of the transfer rollers and configured to include an upper roller and a lower roller, wherein the upper roller includes a plurality of first protrusion cutter modules and a plurality of first groove cutter modules configured to form through holes in the metal foil transferred by the transfer roller at constant intervals, and the lower roller includes a plurality of second protrusion cutter modules and a plurality of second groove cutter modules configured to form the through holes in the metal foil transferred by the transfer roller at constant intervals; a pair of thickness control rollers disposed on one side of the hole formation unit, spaced apart from each other at a specific interval, and configured to perform control so that a thickness of the current collector is smaller than the specific interval; and a recovery reel disposed on one side of the thickness control rollers and configured to recover the metal foil in which the through holes have been formed and that has passed through the thickness control rollers.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
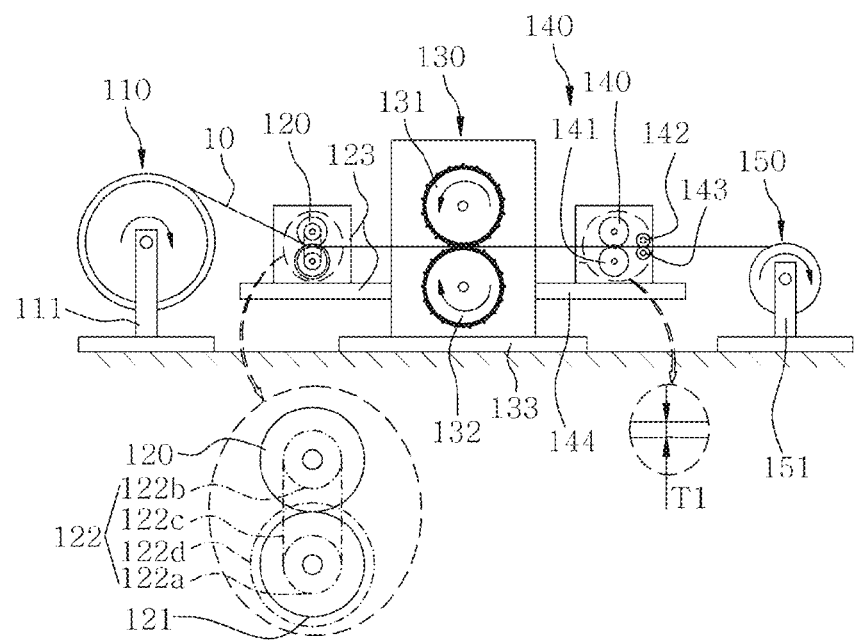
FIG. 1 is a front view schematically illustrating the configuration of an apparatus for manufacturing a current collector according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures. Hereinafter, an apparatus for manufacturing a current collector according to embodiments of the present invention is described with reference to the accompanying drawings.

Figure 2:
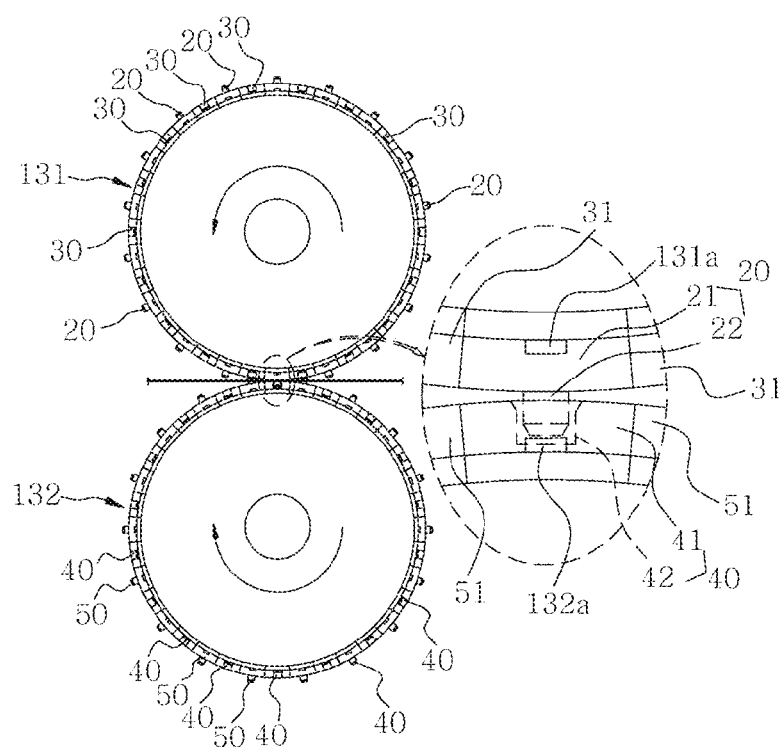
FIG. 2 is a detailed front view illustrating the configuration of a hole formation unit illustrated in FIG. 1.

As illustrated in FIGS. 1 and 2, an apparatus for manufacturing a current collector according to an embodiment of the present invention includes a supply reel 110, a pair of transfer rollers 120 and 121, a hole formation unit 130, a pair of thickness control rollers 140 and 141, and a recovery reel 150.

The supply reel 110 is configured to wind metal foil 10 in which through holes 11 will be formed. The pair of transfer rollers 120 and 121 is rotated, disposed on one side of the supply reel 110, and configured to transfer the metal foil 10 wound on the supply reel 110. The hole formation unit 130 is disposed on one side of the transfer roller 120 and 121. The hole formation unit 130 includes an upper roller 131 and a lower roller 132. The upper roller 131 includes a plurality of first protrusion cutter modules 20 and a plurality of first groove cutter modules 30 configured to form the through holes 11 in the metal foil 10, transferred by the transfer roller 120 and 121, at constant intervals. The lower roller 132 includes a plurality of second groove cutter modules 40 and a plurality of second protrusion cutter modules 50 configured to form the through holes 11 in the metal foil 10, transferred by the transfer roller 120 and 121, at constant intervals. The pair of thickness control rollers 140 and 141 is disposed on one side of the hole formation unit 130, and is spaced apart from each other at a specific interval T1. The pair of thickness control rollers 140 and 141 performs control so that the thickness T2 of the metal foil 10 in which the through holes 11 have been formed is not greater than the interval T1. The recovery reel 150 is disposed on one side of the thickness control rollers 140 and 141, and is configured to recover the metal foil 10 in which the through holes 11 have been formed and which has passed through the thickness control rollers 140 and 141.

The configuration of the apparatus for manufacturing a current collector according to an embodiment of the present invention is described in more detail below.

The supply reel 110 is connected to a support member 111 in such a way as to be rotated, as illustrated in FIG. 1. The metal foil 10 in which the through holes 11 will be formed is wound on the supply reel 110 in a roll type. When the pair of transfer rollers 120 and 121 is rotated, the supply reel 110 unwinds the wound metal foil 10 and supplies the unwound metal foil 10 to the hole formation unit 130.

The pair of transfer rollers 120 and 121 is connected to the support member 123 on one side of the supply reel 110, as illustrated in FIG. 1. The pair of transfer rollers 120 and 121 is rotated by a driving source 122 and is configured to supply the hole formation unit 130 with the metal foil 10 wound on the supply reel 110. The driving source 122 includes belt connection wheels 122a and 122b, a timing belt 122c, and a motor 122d. The belt connection wheels 122a and 122b are connected to the rotation center axis of the pair of transfer rollers 120 and 121, and the timing belt 122c is connected to the belt connection wheels 122a and 122b. The motor 122d is connected to the belt connection wheel 122a connected to one of the pair of transfer rollers 120 and 121, and is configured to rotate the belt connection wheel 122a. When the belt connection wheel 122a is rotated, the transfer roller 121 connected to the belt connection wheel 122a is rotated and at the same time the timing belt 122c is rotated. As a result, the timing belt 122c rotates the transfer roller 120 to which the belt connection wheel 122b is connected, thereby transferring the metal foil 10 to the hole formation unit 130.

The upper roller 131 and lower roller 132 of the hole formation unit 130 are connected to the support member 133 in such a way as to be rotated, as illustrated in FIGS. 1 and 2.

The plurality of first protrusion cutter modules 20 is disposed on the outer circumference surface of the upper roller 131 and is spaced apart from one another at constant intervals. The plurality of first groove cutter modules 30 is disposed on the outer circumference surface of the upper roller 131 so that they are placed between the plurality of first protrusion cutter modules 20.

Figure 3:
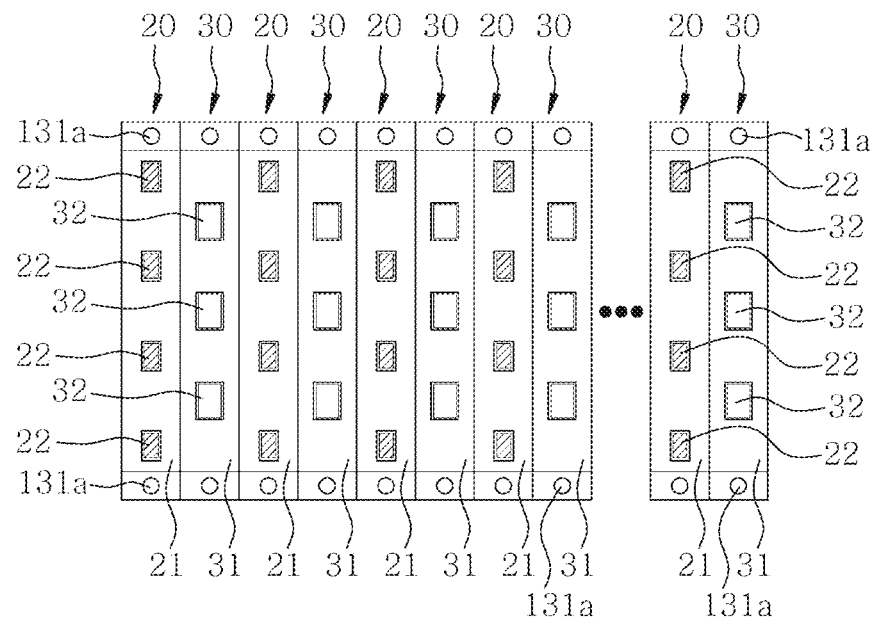
FIG. 3 is an exploded plan view illustrating the outer circumference surface of an upper roller illustrated in FIG. 2.
Figure 4:
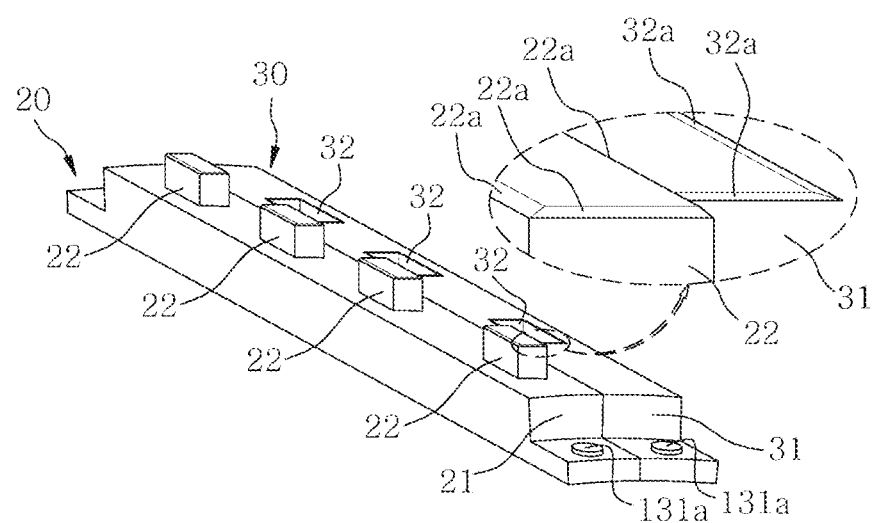
FIG. 4 is an enlarged perspective view of a first protrusion cutter modules and a first groove cutter module illustrated in FIG. 3.

As illustrated in FIGS. 3 and 4, each of the plurality of first protrusion cutter modules 20 disposed on the outer circumference surface of the upper roller 131 and spaced apart from one another at constant intervals includes a first base member 21 and a plurality of first protrusion cutter blades 22. One side and the other side of the first base member 21 are fastened to the outer circumference surface of the upper roller 131 using fastening members 131a, such as bolts or screws. The plurality of first protrusion cutter blades 22 is configured to be protruded from a top surface of the first base member 21 and is spaced apart from one another at constant intervals.

As illustrated in FIGS. 3 and 4, each of the plurality of first groove cutter modules 30 disposed on the outer circumference surface of the upper roller 131 and placed between the plurality of first protrusion cutter modules 20 includes a first base member 31 and a plurality of first groove cutter blades 32. One side and the other side of the first base member 31 are fastened to the outer circumference surface of the upper roller 131 using the fastening members 131a. The plurality of first groove cutter blades 32 is configured to be concaved from a top surface of the first base member 31 and is spaced apart from one another at constant intervals.

The plurality of first protrusion cutter blades 22 and the plurality of first groove cutter blades 32 disposed on the upper roller 131 are formed in the first base members 21 and 31 so that they are disposed to go crisscross and are arranged in zigzags, as illustrated in FIG. 3. That is, the plurality of first protrusion cutter blades 22 and the plurality of first groove cutter blades 32 that are respectively formed in the first protrusion cutter modules 20 and the first groove cutter modules 30 disposed to neighbor each other are formed in the first base members 21 and 31 so that they are disposed to go crisscross and are arranged in zigzags. In this case, the number of first protrusion cutter blades 22 is larger by one than the number of first groove cutter blades 32 so that the first protrusion cutter blades 22 and the first groove cutter blades 32 are spaced apart from each other in zigzags. Each of the plurality of first protrusion cutter blades 22 and the plurality of first groove cutter blades 32 has a rectangular. Cutter blades 22a and 32a are formed to be inclined at the end of each of the plurality of first protrusion cutter blades 22 and the plurality of first groove cutter blades 32, as illustrated in FIG. 4.

Figure 5:
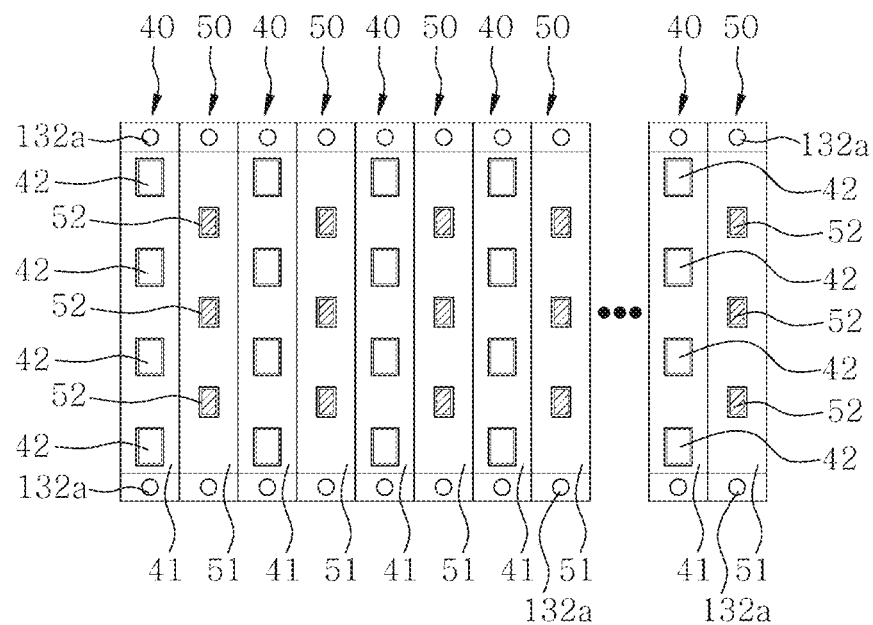
FIG. 5 is an exploded plan view illustrating the outer circumference surface of a lower roller illustrated in FIG. 2.
Figure 6:
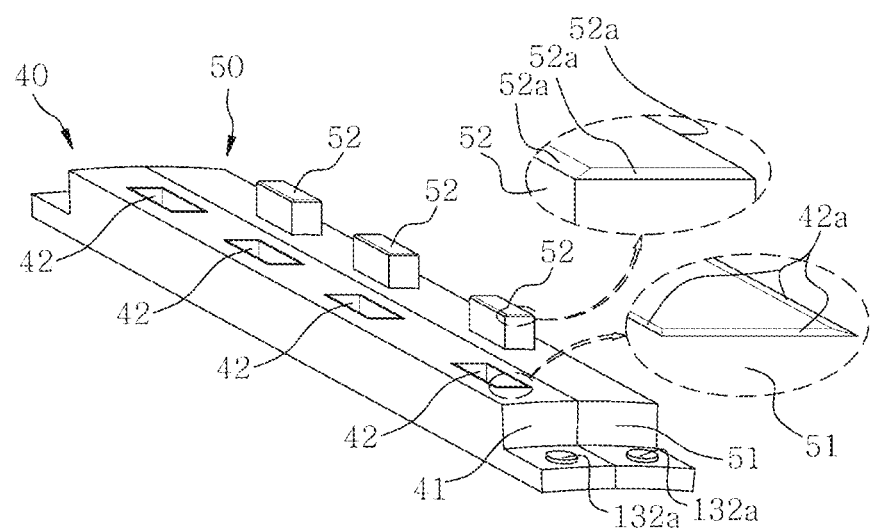
FIG. 6 is an enlarged perspective view of a first protrusion cutter modules and a first groove cutter module illustrated in FIG. 5.

As illustrated in FIGS. 5 and 6, the lower roller 132 is disposed under the upper roller 131, and a plurality of second groove cutter modules 40 and a plurality of second protrusion cutter modules 50 are disposed in the lower roller 132. The plurality of second groove cutter modules 40 is disposed on the outer circumference surface of the lower roller 132 so that they are engaged with the first protrusion cutter modules 20, and is spaced apart from one another at constant intervals. The plurality of second protrusion cutter modules 50 is placed between the plurality of second groove cutter modules 40 so that they are engaged with the first groove cutter modules 30.

Each of the plurality of second groove cutter modules 40 disposed on the outer circumference surface of the lower roller 132 and spaced apart from one another at constant intervals so that they are engaged with the first protrusion cutter modules 20 includes a second base member 41 and a plurality of second groove cutter blades 42. One side and the other side of the second base member 41 are fastened to the outer circumference surface of the lower roller 132, using fastening members 132a, such as bolts or screws. The plurality of second groove cutter blades 42 is configured to be concaved from a top surface of the second base member 41, spaced apart from one another at constant intervals, and engaged with the first protrusion cutter blades 22 so that the through holes 11 are formed in the metal foil 10.

Each of the plurality of second protrusion cutter modules 50 disposed on the outer circumference surface of the lower roller 132 and placed between the plurality of second groove cutter modules 40 so that they are engaged with the first groove cutter modules 30 includes a second base member 51 and a plurality of second protrusion cutter blades 52. One side and the other side of the second base member 51 are fastened to the outer circumference surface of the lower roller 132 using the fastening members 132a. The plurality of second protrusion cutter blades 52 is configured to be protruded from a top surface of the second base member 51, spaced apart from one another at constant intervals, and engaged with the first groove cutter blades 32 so that the through holes 11 are formed in the metal foil 10.

The plurality of second protrusion cutter blades 42 and the plurality of second groove cutter blades 52 that are respectively formed in the second groove cutter modules 40 and the second protrusion cutter modules 50 are formed in the second base members 41 and 51 so that they are disposed to go crisscross and are arranged in zigzags, as illustrated in FIG. 5. That is, the plurality of second protrusion cutter blades 42 and the plurality of second groove cutter blades 52 that are respectively formed in the second groove cutter modules 40 and the second protrusion cutter module 50 disposed to neighbor each other are formed in the second base members 41 and 51 so that they are disposed to go crisscross and are arranged in zigzags, as illustrated in FIG. 5. In this case, the number of second groove cutter blades 52 is larger by one than the number of second protrusion cutter blades 42 so that they are disposed to go crisscross and are arranged in zigzags. Each of the plurality of second protrusion cutter blades 42 and the plurality of second groove cutter blades 52 has a rectangular, as illustrated in FIG. 6. Cutter blades 42a and 52a are formed at the end of each of the plurality of second protrusion cutter blades 42 and the plurality of second groove cutter blades 52.

Figure 7:
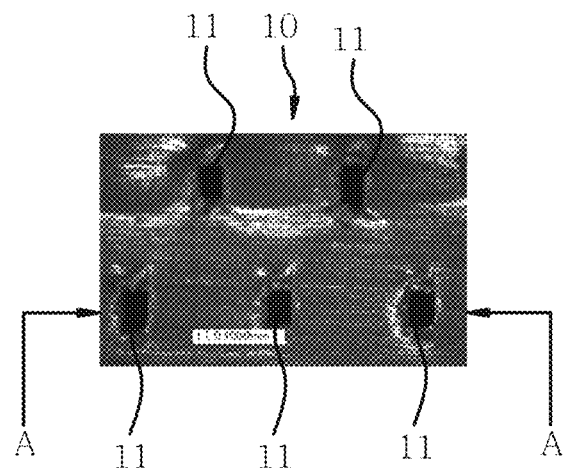
FIG. 7 is a photograph illustrating a current collector manufactured using the apparatus for manufacturing a current collector according to an embodiment of the present invention.
Figure 8:
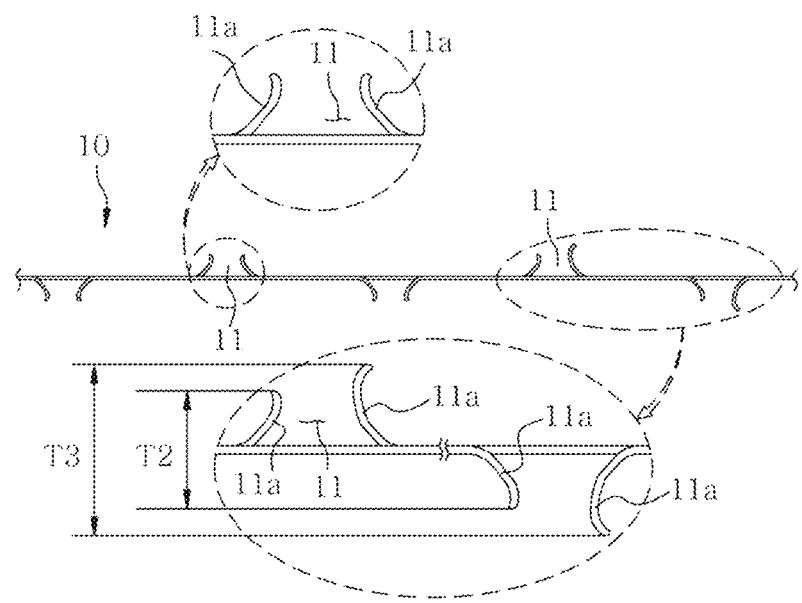
FIG. 8 is a cross-sectional view taken along line A-A in the current collector of FIG. 7.

The pair of thickness control rollers 140 and 141 is connected to a support member 144 in such a way as to be rotated, as illustrated in FIG. 1, and is spaced apart from each other at the specific interval T1 so that the height of burrs 11a formed in the through holes 11 is controlled when the metal foil 10 in which the through holes 11 have been formed passes through the thickness control rollers 140 and 141, thereby controlling the thickness T2 of the metal foil 10 in which the through holes 11 have been formed. For example, when the plurality of through holes 11 is formed in the metal foil 10 so that they are arranged at constant intervals as illustrated in FIG. 7, the burrs 11a are generated in the through holes 11 as illustrated in FIG. 8. The thickness T2 of the metal foil 10 includes the height of the burrs 11a formed in the through holes 11. The interval T1 between the pair of thickness control rollers 140 and 141 controls the thickness of the metal foil 10 so that, for example, a thickness T3 illustrated in FIG. 8 becomes the thickness T2. As a result, the metal foil 10 has the thickness T2.

A pair of horizontal maintenance rollers 142 and 143 is provided on one side of the pair of thickness control rollers 140 and 141 configured to control the thickness T2 of the metal foil 10. The pair of horizontal maintenance rollers 142 and 143 is placed on one side of the thickness control rollers 140 and 141 and is connected to the support member 144 in such a way as to be rotated. The pair of horizontal maintenance rollers 142 and 143 is disposed on one side of the pair of thickness control rollers 140 and 141, and is spaced apart from each other at an interval identical with the interval T1 of the pair of thickness control rollers 140 and 141. The pair of horizontal maintenance rollers 142 and 143 horizontally maintains the metal foil 10 in which the through holes 11 have been formed so that the metal foil 10 has a height permitted by the pair of thickness control rollers 140 and 141.

The recovery reel 150 is disposed on one side of the thickness control rollers 140 and 141, as illustrated in FIG. 1, and is connected to a support member 151 in such a way as to be rotated. The recovery reel 150 recovers the metal foil 10 in which the through holes 11 have been formed and that has passed through the thickness control rollers 140 and 141.

The operation of the apparatus for manufacturing a current collector according to an embodiment of the present invention is described below.

The supply reel 110 on which the metal foil 10 in which the through holes 11 will be formed has been wound is mounted on the support member 111. When the supply reel 110 is mounted on the support member 111, one end of the metal foil 10 wound on the supply reel 110 is made to pass through the hole formation unit 130 and the pair of thickness control rollers 140 and 141, and is then hung on and mounted on the recovery reel 150. When one end of the metal foil 10 is mounted on the recovery reel 150, the pair of transfer rollers 120 and 121 transfers the metal foil 10 to the hole formation unit 130. When the metal foil 10 is transferred to the hole formation unit 130, the upper roller 131 and lower roller 132 of the hole formation unit 130 are rotated by a driving source (not shown) that is the same as the driving source 122 configured to drive the pair of transfer rollers 120 and 121. Accordingly, the through holes 11 are formed in the metal foil 10 that is consecutively transferred by the rotation of the upper roller 131 and lower roller 132. That is, the hole formation unit 130 rotates the upper roller 131 and the lower roller 132 so that the plurality of first protrusion cutter blades 22 of the first protrusion cutter modules 20 provided in the upper roller 131 is engaged with the plurality of second groove cutter blades 42 of the second groove cutter modules 40 provided in the lower roller 132. Accordingly, the through holes 11 in which the burrs 11a are formed in the downward direction of the metal foil 10 are formed in the metal foil 10 at constant intervals, as illustrated in FIGS. 7 and 8.

Furthermore, the hole formation unit 130 rotates the upper roller 131 and the lower roller 132 so that the plurality of first groove cutter blades 32 of the first groove cutter modules 30 disposed in the upper roller 131 in zigzags along with the first protrusion cutter blades 22 is engaged with the plurality of second protrusion cutter blades 52 of the second protrusion cutter modules 50 provided in the lower roller 132. Accordingly, the through holes 11 in which the burrs 11a are formed in the upward direction of the metal foil 10 are formed in the metal foil 10 at constant intervals, as illustrated in FIGS. 7 and 8.

When the through holes 11 are consecutively formed in the metal foil 10 through the aforementioned operation, the pair of thickness control rollers 140 and 141 controls the thickness T2 of the metal foil 10 so that it maintains the interval T1 by controlling the height of the burrs 11a formed in the through holes 11, as illustrated in FIG. 8. That is, when the total thickness of the metal foil 10 becomes "T3" by means of the burrs 11a formed in the through holes 11, bending or removal is performed by "T3-T2" through the pair of thickness control rollers 140 and 141 so that the thickness of the metal foil 10 maintains the interval T1. As a result, the thickness of the metal foil 10 becomes "T2". In this case, the interval T1 between the pair of thickness control rollers 140 and 141 is the same as "T2".

When the metal foil 10 is transferred in the state in which the thickness of the metal foil 10 remains constant at "T2", the recovery reel 150 recovers the metal foil 10. Accordingly, the fabrication of a current collector for forming the through holes 11 in the metal foil 10 is completed through such a continuous process.

As described above, the apparatus for manufacturing a current collector according to an embodiment of the present invention is advantageous in that a current collector can be formed so that the plurality of through holes is formed in metal foil while consecutively transferring the metal foil using the protrusion cutters and the groove cutters. Furthermore, there is an advantage in that the productivity and production cost of a current collector can be reduced by forming a current collector so that the plurality of through holes is formed in metal foil while consecutively transferring the metal foil using the protrusion cutters and the groove cutters.

The apparatus for manufacturing a current collector according to an embodiment of the present invention may be applied to manufacturing sectors, such as lithium cells, lithium capacitors, and electrical double layer capacitors.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for manufacturing a current collector, comprising:
   a supply reel configured to have a metal foil wound on the supply reel;
   a pair of transfer rollers disposed on one side of the supply reel and configured to transfer the metal foil wound on the supply reel;
   a hole formation unit disposed on one side of the transfer rollers and comprising an upper roller and a lower roller disposed under the upper roller,
   wherein the upper roller comprises a plurality of first protrusion cutter modules disposed on an outer circumference surface of the upper roller and spaced apart from one another at a first constant interval and a plurality of first groove cutter modules each placed between two neighboring first protrusion cutter modules, the first protrusion cutter modules and the first groove cutter modules being configured to form through holes in the metal foil transferred by the transfer roller,
   each of the plurality of first protrusion cutter modules comprises a first base member fastened to the outer circumference surface of the upper roller and a plurality of first protrusion cutter blades protruding from a top surface of the first base member, the first protrusion cutter blades being spaced apart from one another at a second constant interval, and
   each of the plurality of first groove cutter modules comprises a second base member fastened to the outer circumference surface of the upper roller and concaved from a top surface of the second base member, the first groove cutter blades being spaced apart from one another at the second constant interval, and
   wherein the lower roller comprises a plurality of second protrusion cutter modules disposed on an outer circumference surface of the lower roller and spaced apart from one another at the first constant interval in such a way as to be engaged with the first protrusion cutter modules and a plurality of second groove cutter modules each placed between two neighboring second protrusion cutter modules in such a way as to be engaged with the first groove cutter modules, the second protrusion cutter modules and the second groove cutter modules being configured to form the through holes in the metal foil transferred by the pair of transfer rollers;
   a pair of thickness control rollers disposed on one side of the hole formation unit, spaced apart from each other at a specific interval, and configured to perform control so that a thickness of the current collector is smaller than the specific interval; and
   a recovery reel disposed on one side of the thickness control rollers and configured to recover the metal foil in which the through holes have been formed and that has passed through the thickness control rollers.

2. The apparatus of claim 1, wherein:
   the pair of transfer rollers comprises a driving source, and
   the driving source comprises belt connection wheels connected to the pair of respective transfer rollers, a timing belt connected to the belt connection wheels, and a motor connected to a belt connection wheel that belongs to the belt connection wheels and that is connected to one of the pair of transfer rollers and configured to rotate the connected belt connection wheel.

3. The apparatus of claim 1, wherein each of the plurality of first protrusion cutter blades is disposed at a position corresponding to between two neighboring first groove cutter blades in such a way as to be arranged in zigzags,
   each of the plurality of first protrusion cutter blades and the plurality of first groove cutter blades has a rectangular form,
   cutter blades formed at an end of each of the plurality of first protrusion cutter blades and the plurality of first groove cutter blades are inclined, and
   a number of the first protrusion cutter blades is larger by one than a number of the first groove cutter blades.

4. The apparatus of claim 1, wherein
   each of the plurality of second groove cutter modules comprises a third base member fastened to the outer circumference surface of the lower roller and a plurality of second groove cutter blades concaved from a top surface of the third base member, the second groove cutter blades being spaced apart from one another at the second constant interval and engaged with the first protrusion cutter blades so that the through holes are formed in the metal foil, and each of the plurality of second protrusion cutter modules comprises a fourth base member fastened to the outer circumference surface of the lower roller and a plurality of second protrusion cutter blades protruding from a top surface of the fourth base member, the second protrusion cutter blades beings spaced apart from one another at the second constant interval and engaged with the first groove cutter blades so that the through holes are formed in the metal foil.

5. The apparatus of claim 4, wherein each of the plurality of second protrusion cutter blades is disposed at a position corresponding to between two neighboring second groove cutter blades in such a way as to be arranged in zigzags, each of the plurality of second protrusion cutter blades and the plurality of second groove cutter blades has a rectangular form, cutter blades at an end of each of the plurality of second protrusion cutter blades and the plurality of second groove cutter blades are inclined, and a number of the second groove cutter blades is larger by one than a number of the second protrusion cutter blades.

6. The apparatus of claim 1, wherein:

the pair of thickness control rollers is spaced apart from each other at a specific interval and is configured to control a thickness of the metal foil in which the through holes have been formed so that burrs formed in the through holes is controlled when the metal foil in which the through holes have been formed passes through the pair of thickness control rollers, a pair of horizontal maintenance rollers is provided on one side of the pair of thickness control rollers spaced apart from each other at an interval identical with the specific interval between the pair of thickness control rollers, and configured to horizontally maintain the metal foil in which the through holes have been formed.

* * * * *